US008385193B2

(12) United States Patent
Wang et al.

(10) Patent No.: US 8,385,193 B2
(45) Date of Patent: Feb. 26, 2013

(54) METHOD AND APPARATUS FOR ADMISSION CONTROL OF DATA IN A MESH NETWORK

(75) Inventors: Xiaofei Wang, San Diego, CA (US); Saishankar Nandagopalan, San Diego, CA (US); Santosh Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 803 days.

(21) Appl. No.: 11/550,056

(22) Filed: Oct. 17, 2006

(65) Prior Publication Data

US 2007/0147241 A1 Jun. 28, 2007

Related U.S. Application Data

(60) Provisional application No. 60/728,247, filed on Oct. 18, 2005.

(51) Int. Cl.
 *H04J 1/16* (2006.01)
(52) U.S. Cl. ........................................................ 370/230
(58) Field of Classification Search .................. 370/229, 370/230–234, 235
 See application file for complete search history.

(56) References Cited

U.S. PATENT DOCUMENTS

| 5,539,815 | A * | 7/1996 | Samba ...................... 379/221.07 |
| 6,678,252 | B1 * | 1/2004 | Cansever ....................... 370/253 |
| 7,007,102 | B2 * | 2/2006 | Billhartz et al. ............... 709/238 |
| 7,180,863 | B1 * | 2/2007 | Bauer et al. .................... 370/237 |
| 7,386,000 | B2 | 6/2008 | Lopponen et al. |
| 2003/0053415 | A1 * | 3/2003 | Balakrishnan et al. ........ 370/229 |
| 2003/0202469 | A1 | 10/2003 | Cain |
| 2003/0204616 | A1 | 10/2003 | Billhartz |
| 2004/0071154 | A1 * | 4/2004 | Wentink ......................... 370/448 |
| 2004/0264501 | A1 | 12/2004 | Zalitzky et al. |
| 2005/0083838 | A1 * | 4/2005 | Kandala ......................... 370/230 |
| 2005/0190771 | A1 * | 9/2005 | Tan et al. ................... 370/395.21 |
| 2005/0197148 | A1 * | 9/2005 | Ali et al. ......................... 455/522 |
| 2006/0034288 | A1 * | 2/2006 | Lataretu ...................... 370/395.2 |
| 2006/0133272 | A1 * | 6/2006 | Yuan et al. ..................... 370/230 |
| 2006/0165036 | A1 * | 7/2006 | Chandra et al. ............... 370/329 |
| 2006/0251119 | A1 * | 11/2006 | Ramesh ......................... 370/468 |
| 2008/0062878 | A1 * | 3/2008 | Habetha et al. ............... 370/235 |

FOREIGN PATENT DOCUMENTS

| AU | 2003232006 | | 11/2003 |
| JP | 2004320405 | A | 11/2004 |
| JP | 2005524315 | T | 8/2005 |
| JP | 2007532047 | T | 11/2007 |
| WO | WO9805129 | | 2/1998 |
| WO | WO0105162 | A1 | 1/2001 |
| WO | WO0232179 | A1 | 4/2002 |

(Continued)

OTHER PUBLICATIONS

Dongmei Zhao et al., "Admission Control with load balancing in IEEE 802.11-based ESS Mesh networks," Quality of Serivce in Heterogeneous Wired/Wireless Networks, 2005, IEEE 2nd International Conference on Orlando, Florida.

(Continued)

*Primary Examiner* — Obaidul Huq
(74) *Attorney, Agent, or Firm* — Mary A. Fales

(57) ABSTRACT

An apparatus and method of controlling a traffic stream in a mesh network comprising receiving at a second node a traffic stream admission request to admit a traffic stream from a first node, determining a traffic load for the second node, and determining whether to admit or deny the traffic stream from the first node using the traffic load.

39 Claims, 10 Drawing Sheets

FOREIGN PATENT DOCUMENTS

| WO | WO03094025 A1 | 11/2003 |
| WO | WO2004036838 | 4/2004 |
| WO | 2005/069878 A | 8/2005 |
| WO | 2006/060239 A | 6/2006 |
| WO | 2006/099099 A | 9/2006 |

OTHER PUBLICATIONS

European Search Report—EP10163074, Search Authority—The Hague Patent Office, Sep. 22, 2010.

International Search Report and Written Opinion—PCT/US2006/040760, International Search Authority—European Patent Office—Feb. 14, 2007.

Taiwanese Search report—095138462—TIPO—Dec. 2, 2010.

Translation of Office Action in Japanese application 2008-536778 corresponding to U.S. Appl. No. 11/550,056, citing JP2005524315, WO05069878, US6678252, WO0609099 and WO06060239.Dated Jan. 11, 2011.

European Search Report—EP11164059—Search Authority—The Hague—Aug. 1, 2011.

\* cited by examiner

METHOD AND APPARATUS FOR ADMISSION CONTROL OF DATA IN A MESH NETWORK

CLAIM OF PRIORITY UNDER 35 U.S.C. §119

The present application for patent claims priority to Provisional Application No. 60/728,247 filed Oct. 18, 2005, and assigned to the assignee hereof and hereby expressly incorporated by reference herein.

BACKGROUND

1. Field

The disclosure may relate to mesh networks. More particularly, the disclosure may relate to a method and apparatus for admission control of data in a mesh network.

2. Background

In recent years, there has been an increase in demand for widespread access to high speed data services. The telecommunication industry has responded to the increase in demand by offering a variety of wireless products and services. In an effort to make these products and services interoperable, the Institute for Electrical and Electronics Engineers (IEEE) has promulgated a set of wireless local area network (WLAN) standards, e.g., IEEE 802.11. The products and services that conform to these standards are frequently networked in a wireless point to multipoint configuration. In one configuration, individual wireless devices (e.g., stations) may communicate directly with an Internet access point, with each of the wireless devices sharing the available bandwidth.

Another configuration may be a mesh network. A mesh network may be a distributed network having multiple wireless nodes. Each node may act as a repeater capable of receiving traffic, transmit or transport streams (TSs) and relaying the TSs to a next node. A TS may proceed from an origination node to a destination node by "hopping" from node to node. TS routing algorithms may insure that TSs are routed efficiently from their origination node to their destination node. TS routing algorithms may dynamically adapt to changes in the mesh network and may enable the mesh network to be more efficient and resilient. For example, in the event a node is too busy to handle the TS or a node has dropped out of the mesh network, the TS routing algorithm may route the TS to the destination node through other nodes in the network.

Mesh networks may frequently include a hierarchy of nodes with different operating characteristics. In some mesh network architectures, nodes at the bottom of the hierarchy may include stations. Stations may include individual wireless devices such as a laptop computer or a personal digital assistant, among many others. Mesh points may include nodes that may be considered to be a layer above the stations. Mesh points may also form a wireless backbone. Mesh points may be capable of receiving TSs from, and transmitting TSs to, other mesh points. Mesh access points (MAPs), a special type of mesh point, may provide a gateway or connection path between stations and mesh points. Mesh access points may allow TSs to "hop" between a station and a mesh point. Mesh portals, another special type of mesh point, may provide a gateway for devices that conform to different wireless standards, e.g., 802.11(a/b/g/n). Mesh portals may allow TSs from non-mesh networks to enter into, and depart from, a mesh network.

Communication devices complying with 802.11(s) may have different Quality of Service (QoS) requirements for the TSs. QoS may include a number of parameters, such as the number of dropped packets, packet delay times, packet jitters, number of out of order delivery of packets, and number of packets received in error, among many others. Using these parameters, one can see that for different communication devices, users and applications may need different QoSs. For example, Internet telephony may need a QoS with a small packet delay time, and a small packet jitter to allow a two-way conversation to be intelligible. A streaming video lecture may also need a small packet jitter to provide presentable video images, and a coherent one-way audio track, but a large packet delay might be acceptable. QoS requirements may begin to be even more critical and complex as the diversity of communication devices, users and applications increase. For example, a real time interactive gaming experience between two people in two different geographic regions may have very complex and stringent QoS requirements.

Large scale deployment of wireless devices in mesh networks may pose challenges for network design, including admission control of TSs with diverse QoS requirements and priorities, among many others.

SUMMARY

Traffic load information around mesh nodes may be known, or relatively easily determined. The mesh nodes may use the traffic load information to determine the local wireless bandwidth available to accommodate new traffic streams (TSs) at each of the nodes. TS routing algorithms may evaluate potential routes for new TSs through the mesh network. An origination node may initiate an admission request for a new TS along a potential TS route. The admission request may be sent node to node from the origination node to a destination node. Each node receiving the admission request may compare the admission request with the local traffic load information and may determine whether the new TS can be accommodated. If the TS can be accommodated, a transmission opportunity (TXOP) is set aside, and the admission request may be propagated to the next node along the potential route. If the TS cannot be accommodated, the TS request may be denied, and the admission request may be propagated along other potential routes.

A method of controlling a traffic stream in a mesh network comprising receiving at a second node a traffic stream admission request to admit a traffic stream from a first node, determining a traffic load for the second node, and determining whether to admit or deny the traffic stream from the first node using the traffic load.

BRIEF DESCRIPTION OF THE DRAWINGS

Claimed subject matter is particularly pointed out and distinctly claimed in the concluding portion of the specification. However, such subject matter may be understood by reference to the following detailed description when read with the accompanying drawings in which:

DETAILED DESCRIPTION

Methods and apparatus that implement the embodiments of the various features of the disclosure will now be described with reference to the drawings. The drawings and the associated descriptions are provided to illustrate embodiments of the disclosure and not to limit the scope of the disclosure. Reference in the specification to "one embodiment" or "an embodiment" is intended to indicate that a particular feature, structure, or characteristic described in connection with the embodiment is included in at least an embodiment of the disclosure. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
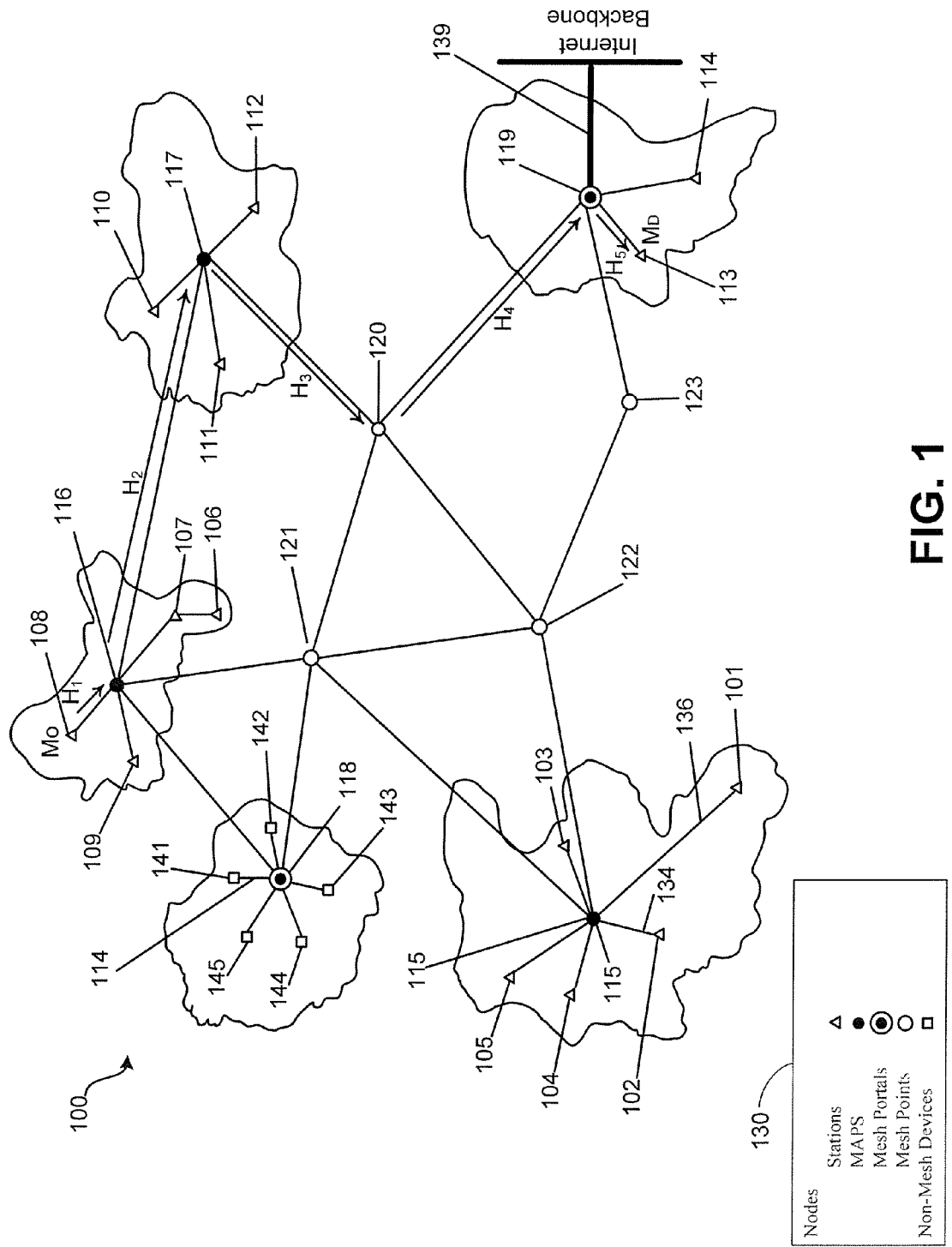
FIG. 1 is a diagram of an exemplary mesh network according to an embodiment.

FIG. 1 is a diagram of an exemplary mesh network 100 according to an embodiment. The mesh network 100 may be a hierarchical network of mesh nodes, and may include, for example, a first node 101 through a twenty-third node 123. Network 100 may include many different types of nodes and devices, as indicated in this embodiment by legend 130. The mesh network 100 may include a plurality of stations (STAs), such as the first through the fourteenth nodes 101-114. In one embodiment, one station (e.g., 101) may not associate with another station (e.g., 102). The stations may be any device that conforms to the wireless standard of the mesh network 100. The stations may include, for example, computers, personal digital assistants, networked gaming devices, telephones, televisions or terminals. The wireless standard of the mesh network 100 may be any proprietary standard and/or open architecture standard such as, but not limited to, the IEEE 802.11(s) standard.

The mesh network 100 may include one or more MAPs, such as nodes 115-117 and 119. The stations may form the base of the mesh network hierarchy and may access mesh nodes higher in the hierarchy through gateway nodes, such as mesh access points (MAPs) and mesh portals. A station, such as node 102, may access a MAP, such as node 115, through a direct communication link 134. Communication link 134 may be wired, wireless and/or combination thereof. A station, such as node 101, may access a mesh point, such as node 122, by traveling from node 101 to node 115 to node 122.

Mesh portals may include nodes that may communicate with non-mesh devices as shown in FIG. 1. The mesh network 100 may include one or more mesh portals, for example, node 118. A mesh portal, such as node 118, may communicate with non-mesh devices, such as devices 141-145. The non-mesh devices may be networked in a local area network that features non-mesh connections 114, such as Ethernet connections, among others. For example, the non-mesh devices 141-145 may be wired in a star configuration using twisted pair copper wire. Each of the non-mesh devices 141-145 may or may not be capable of conforming to protocols of the mesh network 100.

In an embodiment, node 118 may be an Ethernet hub, and may conform to the mesh network protocol. Node 118 may be capable of allowing TSs originating at each of the non-mesh devices 141-145 to travel into the mesh network 100. In this manner, mesh portal 118 may be capable of serving as mesh network 100 gateways for non-mesh devices 141-145. Networks featuring mesh portals 118 and non-mesh devices 141-145 may not be limited to Ethernet networks; other networks may be configured and may operate in a similar manner. Non-mesh devices 141-145 may be configured in many different types of networks, such as but not limited to, token ring networks, and/or 802.11(b) point to multipoint networks, and/or combinations thereof.

Mesh portal 118 may also have a link to the Internet or other wide area network, such as through node 119. Node 119 may be coupled to an Internet backbone, making node 119 an Internet access point, as well as a mesh portal. Node 119 may form a bridge between the wireless mesh network 100 and the Internet. The bridge may serve as a connection between any of the nodes in the mesh network 100 and any Internet enabled device.

Mesh points may include nodes that may relay data between other mesh points, MAPs, and/or mesh portals. The mesh network 100 may include one or more mesh points such as nodes 120-123. The mesh points, MAPs, and mesh portals may form an upper layer of mesh nodes in the mesh network 100 hierarchy. TSs originating at non-mesh devices and stations may enter the upper layer through mesh portals and MAPs. The TSs may travel along the nodes of the upper layer of the mesh network 100 until they depart through another mesh portal and/or a MAP.

FIG. 1 also shows the routing of an exemplary traffic stream (TS), shown as Mo. In an embodiment, TS Mo may originate at a node 108 (e.g., a station 108) in the mesh network 100. TS Mo may also terminate at a node 113 (e.g., a station 113) in the mesh network 100. A suitable TS route from node 108 to node 113 may be determined using a routing algorithm. After a suitable TS route is determined, access and TXOP may be negotiated at each node along the route. TS Mo may then be transmitted along the route. Node 108 may be capable of transmitting TS Mo to node 116 in a first hop $H_1$. Node 116 may be capable of receiving TS Mo, and may be further capable of transmitting TS Mo to node 117 in a second hop $H_2$. Node 117 may be capable of receiving TS Mo, and may be capable of transmitting TS Mo to node 120 in a third hop $H_3$. Node 120 may be capable of receiving TS Mo and transmitting TS Mo to node 119 in a fourth hop $H_4$. Node 119 may be capable of transmitting TS Mo to node 113 in a fifth and final hop $H_5$, of this embodiment.

Figure 2:
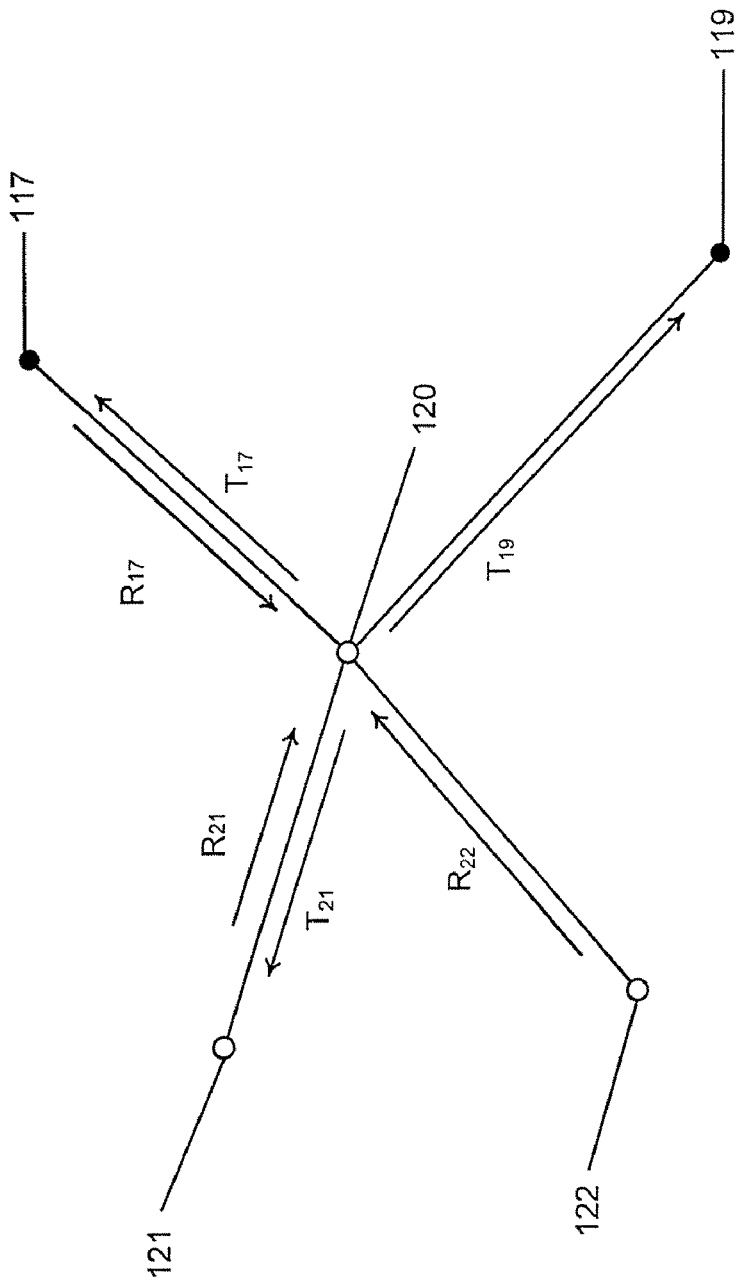
FIG. 2 is a diagram of a portion of the exemplary mesh network of FIG. 1 showing traffic streams (TSs) transmitted and received at an exemplary mesh node according to an embodiment.

FIG. 2 is a diagram of a portion of the exemplary mesh network 100 of FIG. 1 showing the TSs transmitted and received at an exemplary mesh node 120. In this embodiment, node 120 may be capable of transmitting and receiving TSs from four other nodes 117, 119 121 and 122. Node 120 may be said to be in the network neighborhood of these four nodes. In this embodiment, node 120 may be capable of receiving TSs $R_{17}$, $R_{21}$ and $R_{22}$ from nodes 117, 121 and 122, respectively. Also, node 120 may be capable of transmitting TSs $T_{17}$, $T_{19}$ and $T_{21}$ to nodes 117, 119 and 121, respectively. Note that in this example, the nodes 117, 119, or 121 are not "leaf" nodes, the TSs $R_{17}$, $R_{21}$ and $R_{22}$, and $T_{17}$, $T_{19}$ and $T_{21}$ may themselves be aggregates of other TSs at nodes 117, 119, or 121.

The traffic at node 120 may be represented by two vectors (i.e. a transmit vector and a receive vector). In an embodiment, a TS may be represented by the fraction of time occupied on the channel to transmit data associated with the TS over an established period of time, for example, a scheduled service interval (SSI). Traffic load or medium occupancy in this context may be represented by quantities such as $t_{busy}$, where the value indicates the amount of time occupied on the channel as busy over the established period of time, for example, the scheduled service interval (SSI). Thus, a transmit vector $T_{20}$ (shown as 210) may have four elements with the first element being the time, $t_{T17}$, to transmit a TS $T_{17}$ from node 120 to node 117 the second element being the time, $t_{T19}$, to transmit a TS $T_{19}$ from node 120 to node 119, the third element being the time, $t_{T21}$, to transmit a TS $T_{21}$ from node 120 to node 121, and the fourth element being the time, $t_{T22}$, to transmit a TS from node 120 to node 122. In this example, the fourth element, $t_{T22}$, of the transmit vector $T_{20}$ 210 would be zero since node 120 does not transmit any TSs to node 122. Here, $t_{T17}$ is the time occupied on the channel for the transmission of TS $T_{17}$ per SSI.

Similarly, a receive vector $R_{20}$ (shown as 212) may have four elements with the first element being the time, $t_{R17}$, to receive a TS $R_{17}$ from node 117, the second element being the time, $t_{R19}$, to receive a TS $R_{19}$ from node 119, the third element being the time, $t_{R21}$, to receive a TS $R_{21}$ from node 121, and the fourth element being the time, $t_{R22}$, to receive a TS from 122 node. In this example, the second element, $t_{R19}$, of the receive vector $R_{20}$ 212 would be zero since node 120 does not receive any TSs from node 119. Again, here, $t_{R17}$ is the time occupied on the channel for the transmission of TS $R_{17}$ per SSI.

The traffic load ($t_{load}$), i.e., the amount of time that the medium around node 120 may be considered loaded as a portion of the SSI, at node 120 or any other node may be determined in various ways, including measurement. In an embodiment, node 120 may be capable of monitoring the clear channel assessment (CCA) busy indication as detected by the physical layer (PHY) of node 120 to determine a busy time ($t_{busy}$). Node 120 may also be capable of monitoring the quiet time ($t_{qnav}$) of the network allocation vector to account for the fraction of time node 120 may not transmit, even though the CCA busy indication may indicate that the channel is not busy. The Network Allocation Vector (NAV) is obtained by processing reservations from surrounding nodes. The quiet time ($t_{qnav}$) may represent the time that the channel is unavailable so that the nodes 117, 119, 121, 122 coupled to node 120 may be capable of receiving communications from nodes other than node 120. The amount of time that the channel is unavailable due to the CCA busy indications and the quiet time ($t_{qnav}$) is the traffic load ($t_{load}$). The traffic load ($t_{load}$) at any node in the mesh network 100 may be represented by the equation:

$$t_{load} = t_{busy} + t_{qnav}$$

Figure 3:
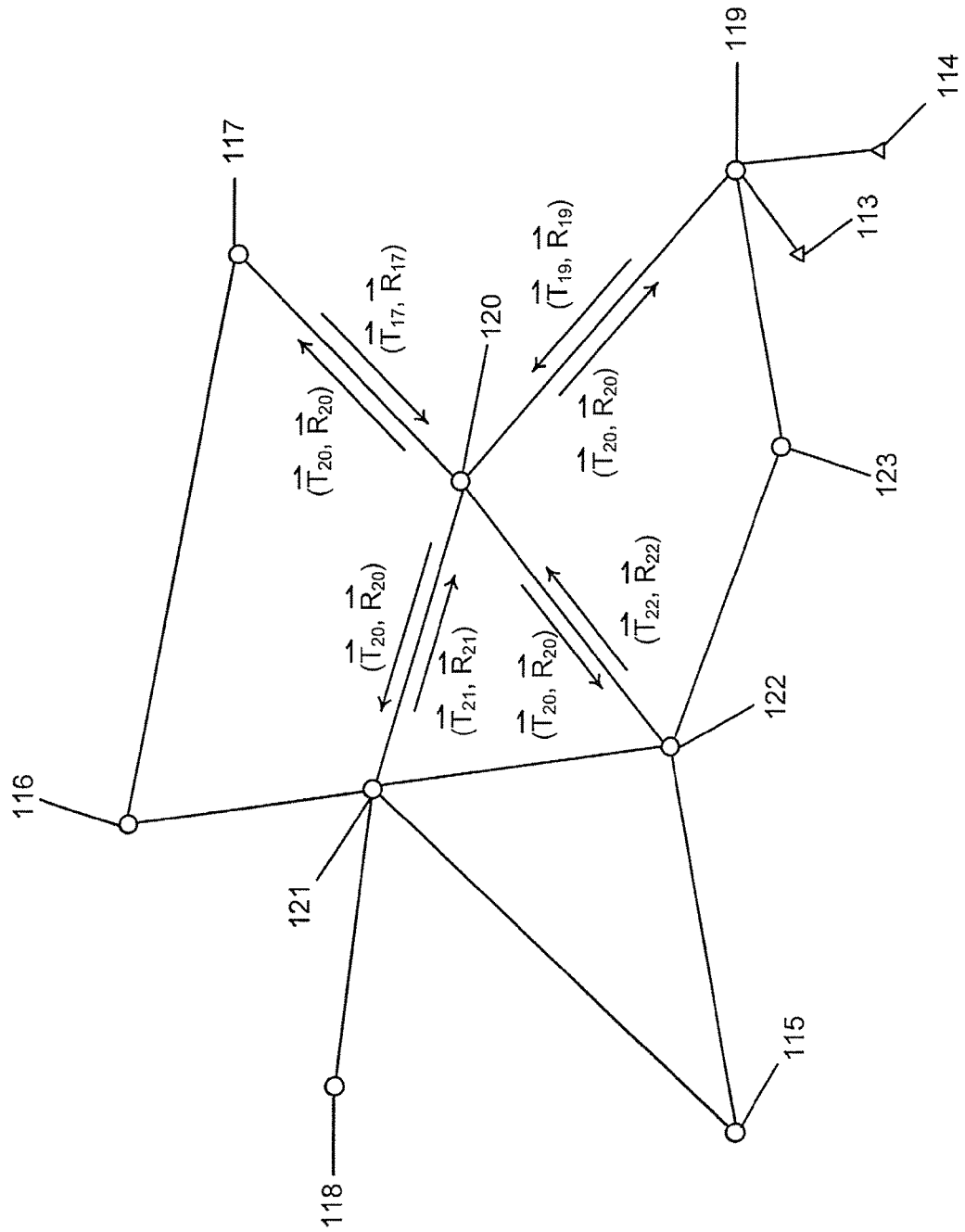
FIG. 3 is a diagram of a portion of the mesh network of FIG. 1 showing the traffic flow information for an exemplary node and each of the nodes in the neighborhood of the exemplary node according to an embodiment.

FIG. 3 is a diagram of a portion of the mesh network 100 of FIG. 1 showing the traffic flow information for an exemplary node 120 and each of the nodes 117, 119, 121 and 122 in the neighborhood of the exemplary node 120. In an embodiment, neighboring nodes may be defined as nodes within one communication link of a node. The neighboring nodes of node 120 are nodes 117, 119, 121 and 122. Thus, FIG. 3 shows the nodes needed to determine T and R, the portions of time during an SSI that are spent on transmitting or receiving for node 120 and each of its neighboring nodes 117, 119, 121 and 122. In an embodiment, each node may transmit T and R as part of the node's beacon. Each node may also monitor the beacons of other nodes to receive traffic load information from the neighboring nodes. For example, node 120 may transmit its T and R pair, $T_{20}$ and $R_{20}$. $T_{20}$ and $R_{20}$ may be monitored by the neighboring nodes of node 120. The neighboring nodes 117, 119, 121 and 122 may also transmit their respective T and R pairs, $T_{17}$ and $R_{17}$, $T_{19}$ and $R_{19}$, $T_{21}$ and $R_{21}$, and $T_{22}$ and $R_{22}$, to other nodes such that the other nodes may monitor these parameters.

Each node, by monitoring the beacons of neighboring nodes, may determine the local TS traffic load and hence the available bandwidth. The local TS traffic load in a node's neighborhood may be determined by forming a transmit and receive matrix pair Tx and Rx. The rows and columns of the Tx and Rx pair may correspond to the transmit and receive parameters of the nodes in the mesh network 100. Tx and Rx may then be populated with information from the individual T and R pairs received from each of the neighboring nodes. T, R, Tx and Rx may each represent a value, a vector or a matrix.

For example, node 120 may monitor the beacon of each of the neighboring nodes. Node 120 may receive the $T_{17}$ and $R_{17}$ pair from node 117, $T_{19}$ and $R_{19}$ pair from node 119, $T_{21}$ and $R_{21}$ pair from node 121, and $T_{22}$ and $R_{22}$ pair from node 122. Node 120 may parse the received T and R pairs to populate its $Tx_{20}$ and $Rx_{20}$ matrices. Each row and column of $Tx_{20}$ and $Rx_{20}$ may correspond at least in part with a node of the mesh network 100. For example, row 17, column 16 of $Tx_{20}$ may be populated with the amount of time it takes a TS to be transmitted from node 117 to node 116. This time information may also be available in the transmit vector $T_{17}$ of node 117 and the receive vector $R_{16}$ of node 116. Similarly, row 21, column 22 of $Rx_{20}$ may be populated with the amount of time it takes node 121 to receive a TS from node 122. This time information may also be available in the receive vector $R_{21}$ of node 121 and the transmit vector $T_{22}$ of node 122.

The traffic load around node 120 may be determined from $Tx_{20}$ and $Rx_{20}$ by summing the maximum values for each transmit receive pairs of $Tx_{20}$ and $Rx_{20}$. For example, row 21, column 22 of $Tx_{20}$ which represents the amount of time it takes a TS to be transmitted from node 121 to node 122 may be compared with row 22, column 21 of $Rx_{20}$ which represents the amount of time it takes node 122 to receive a TS from node 121. The maximum value of each transmit receive pairs of $Tx_{20}$ and $Rx_{20}$ may represent the amount of unavailable time for new TSs at node 120 because the transmit medium is unavailable. For example, the maximum value of row 21, column 22 may represent the amount of time the transmit medium is unavailable to node 120 because TSs are being transmitted between node 121 and node 122. The sum of the maximum values over the $Tx_{20}$ and $Rx_{20}$ pairs may be used at least in part to determine the local traffic load at node 120. The traffic load at any node in the mesh network 100 may be determined at least in part by utilizing the equation:

$$\sum_{i,j} \max(Tx_{i,j}, Rx_{j,i})$$

The traffic load may then be used by node 120 to determine whether there is adequate channel bandwidth available around node 120 to admit new TSs. Node 120 may ensure that the new TSs can be accommodated without interfering with other TSs being transmitted and received at node 120 or at neighboring nodes. When node 120 receives a TS admission request, node 120 may compare the admission request with the traffic load at node 120 and determine whether it is capable of receiving the TS and transmitting the TS to the next node in the route without interfering with other TSs at or near node 120. If node 120 can accommodate the new TS, node 120 may admit the TS. If node 120 cannot accommodate the new TS, node 120 may reject the TS. The previous node may then invoke a routing algorithm to determine the next most appropriate route and/or another appropriate route to the destination node, effectively bypassing node 120.

Figure 4:
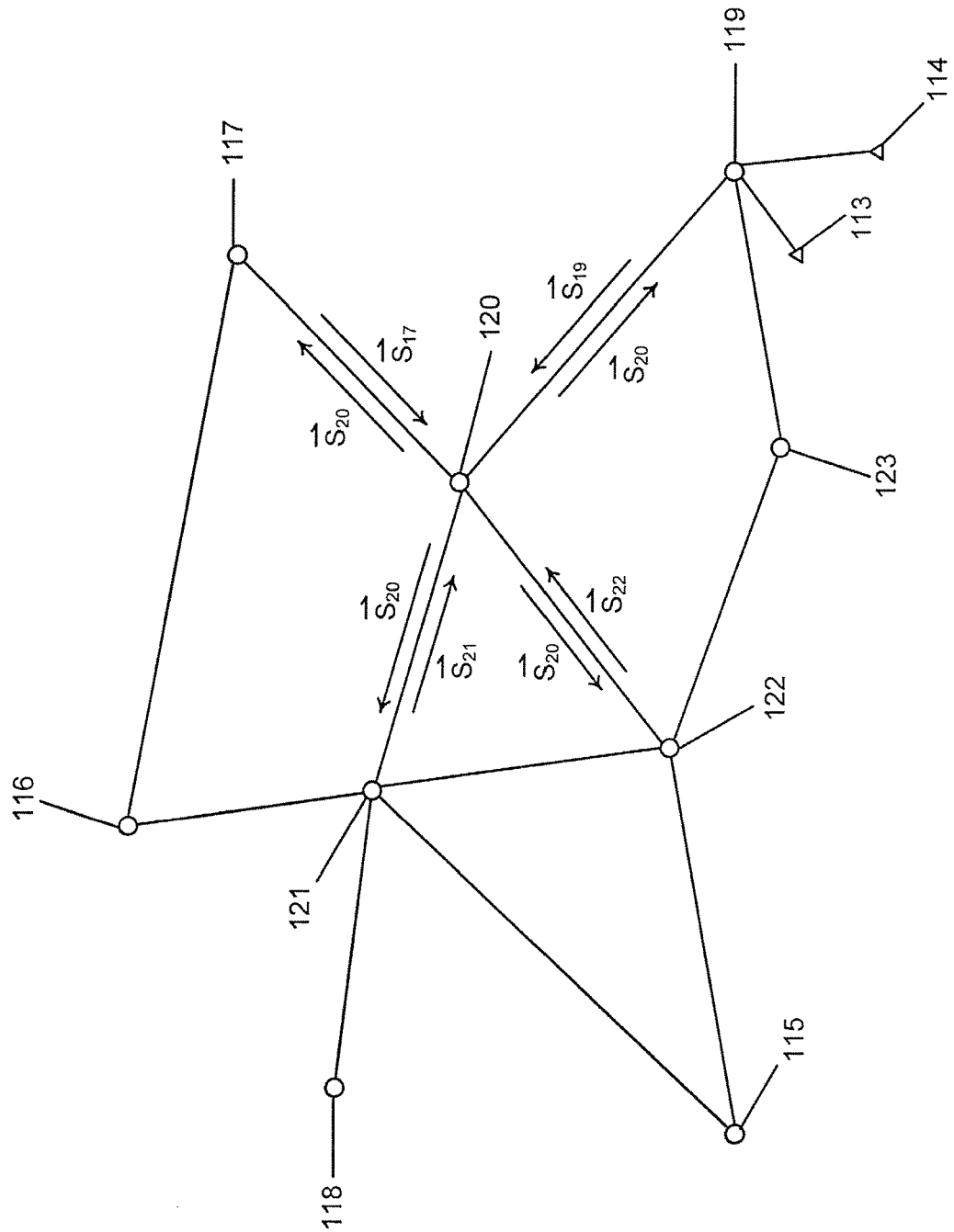
FIG. 4 is a diagram of a portion of the mesh network of FIG. 1 showing the traffic flow information for an exemplary node and each of the nodes in the neighborhood of the exemplary node according to an embodiment.

FIG. 4 is a diagram of a portion of the mesh network 100 of FIG. 1 showing the traffic flow information for an exemplary node 120 and each of the nodes 117, 119, 121 and 122 in the neighborhood of the exemplary node 120. The neighbors of nodes 117, 119, 121 and 122 are also shown. Node 120 may transmit a sum vector $S_{20}$ to each of the neighboring nodes. Each neighboring node may also transmit their respective sum vectors S, with node 117 transmitting $S_{17}$, node 119 transmitting $S_{19}$, node 121 transmitting $S_{21}$, and node 122 transmitting $S_{22}$. Each element of S may contain the collective transmit and receive times to and from the node to each of its neighboring nodes. In an embodiment, the $S_{20}$ vector of node 120 may include four elements, with each element representing the sum of transmit and receive times of node 120 to each of the neighboring nodes of node 120. The first element may be the sum of the transmit and receive times of node 117, the second element may be the sum of the transmit and receive times of node 119, the third element may be the sum of the transmit and receive times of node 121, and the fourth element may be the sum of the transmit and receive times of node 122.

One advantage of transmitting S instead of Tx and Rx may be that S may be smaller in size, approximately half the size of Tx and Rx in an embodiment. This may reduce the time and bandwidth needed to transmit traffic load information. The overhead may be significant, especially for busy nodes with a high degree of network graph (i.e., nodes having many neighbors).

Node 120 may monitor the transmissions of the neighbors of node 120 and store the S vectors of each of the neighbors. The traffic load for node 120 may be determined by constructing a load matrix ST with each of the rows and columns representing mesh nodes in the mesh network 100. The load matrix ST may be populated with the sum of transmit and receive times for each of node 120's neighbors. In an embodiment, row 21 of the load matrix ST may be populated with elements of $S_{21}$ representing the S vector from node 121. Row 21, column 22 of the load matrix ST may be populated with the element of $S_{21}$ corresponding to the sum of transmit and receive times of node 121 to and from node 122. The traffic load around node 120 may then be determined at least in part by comparing transmit and receive row column pairs and selecting a relative maximum value. For example, row 21, column 22 of ST may be compared with row 22, column 21 of ST and the relative maximum value may be used for load determination. The sum of all row column pair comparisons may then be used at least in part to determine the traffic load around node 120. The traffic load around any node in the mesh network 100 may be determined at least in part by the equation:

$$\sum_{i,j} \max(ST_{i,j}, ST_{j,i})$$

The calculated traffic load information may be used by node 120 to determine if new TSs may be admitted. When node 120 receives a TS admission request, node 120 may compare the admission request with the traffic load and determine whether node 120 is capable of receiving the TS, and may forward the TS to the next node in the route without jeopardizing other TSs at node 120 or other nodes in the neighborhood. If node 120 is capable of receiving and forwarding the TS, node 120 may admit the TS. If node 120 is not capable of receiving and forwarding the TS, node 120 may reject the TS and the previous node may invoke routing algorithms to bypass node 120. Therefore, in an embodiment, a node of the mesh network 100 may measure or calculate the traffic load in their neighborhood and use the traffic load information to perform admission control.

Figure 5:
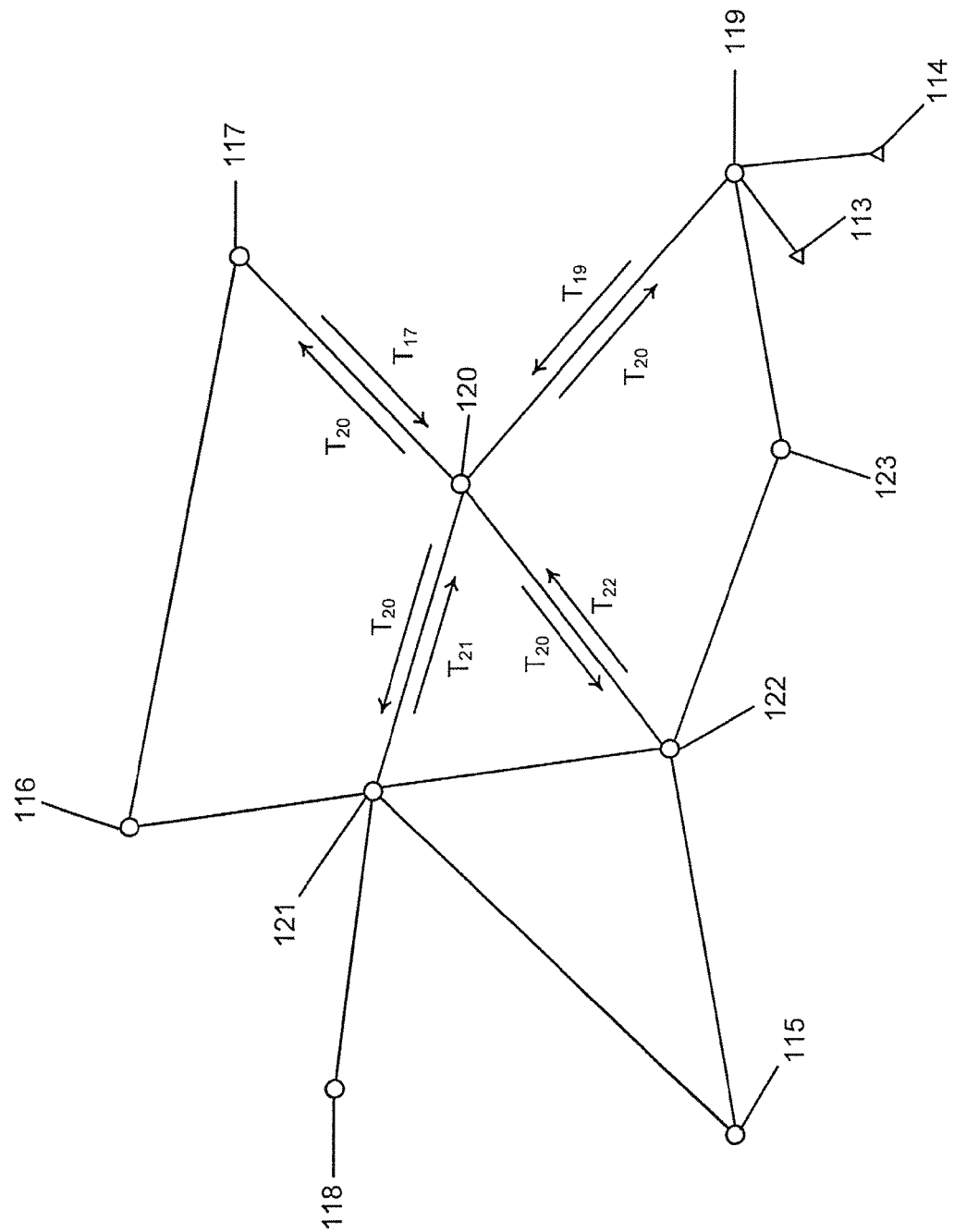
FIG. 5 is a diagram of a portion of the mesh network of FIG. 1 showing traffic flow information for an exemplary node and each of the nodes in the neighborhood of the exemplary node according to an embodiment.

FIG. 5 is a diagram of a portion of the mesh network 100 of FIG. 1 showing traffic flow information for an exemplary node 120 and each of the nodes 117, 119, 121 and 122 in the neighborhood of the exemplary node according to an embodiment. Traffic loads around each node of the mesh network 100 may be determined by measurement and monitoring neighboring nodes for a scalar parameter. The neighbors of nodes 117, 119, 121 and 122 are also shown in FIG. 5. In an embodiment, each of the nodes may broadcast a parameter such as busy times. Each of the nodes may measure the channel busy time as detected by their respective PHY. The channel busy times may then be broadcast by each of the nodes.

Node 120 may monitor its PHY for busy indications over one or more beacon intervals. The amount of time, T, that node 120's PHY reports that the channel is busy, $T_{20}$, may be broadcast. Similarly, the neighbors of node 120 may monitor their PHYs to determine the amount of time that their respective PHYs indicate the channel is busy. The neighboring nodes may also broadcast these measured busy times. $T_{20}$ may be used by its neighboring nodes 117, 119, 121 and 122. Node 120 may receive $T_{17}, T_{19}, T_{21}$ and $T_{22}$ from the respective neighboring nodes. Node 120 may also monitor the average quiet network access vector ($t_{qnav}$) time. Node 120 may then calculate the traffic load around node 120 at least in part by summing $T_1, T_2, T_3$ and $T_4$ and the $t_{qnav}$ time. The traffic load at any node in the mesh network 100 may be calculated at least in part utilizing the equation:

$$\sum_i T_i + t_{qnav}$$

The traffic load may then be utilized by node 120 to determine the ability to admit new TSs. Node 120 may ensure that new TSs do not jeopardize the TSs currently being transmitted and received at nodes in the neighborhood. When node 120 receives a TS admission request, node 120 may compare the admission request with the traffic load and may determine whether node 120 is capable of receiving the TS, and forward the TS to the next node without jeopardizing the other TSs. If it is determined that node 120 is able to admit the new TS, node 120 may admit the TS. If it is determined that node 120 is not able to admit the new TS, node 120 may reject the TS, and the previous node may invoke routing algorithms to bypass node 120.

Figure 6:
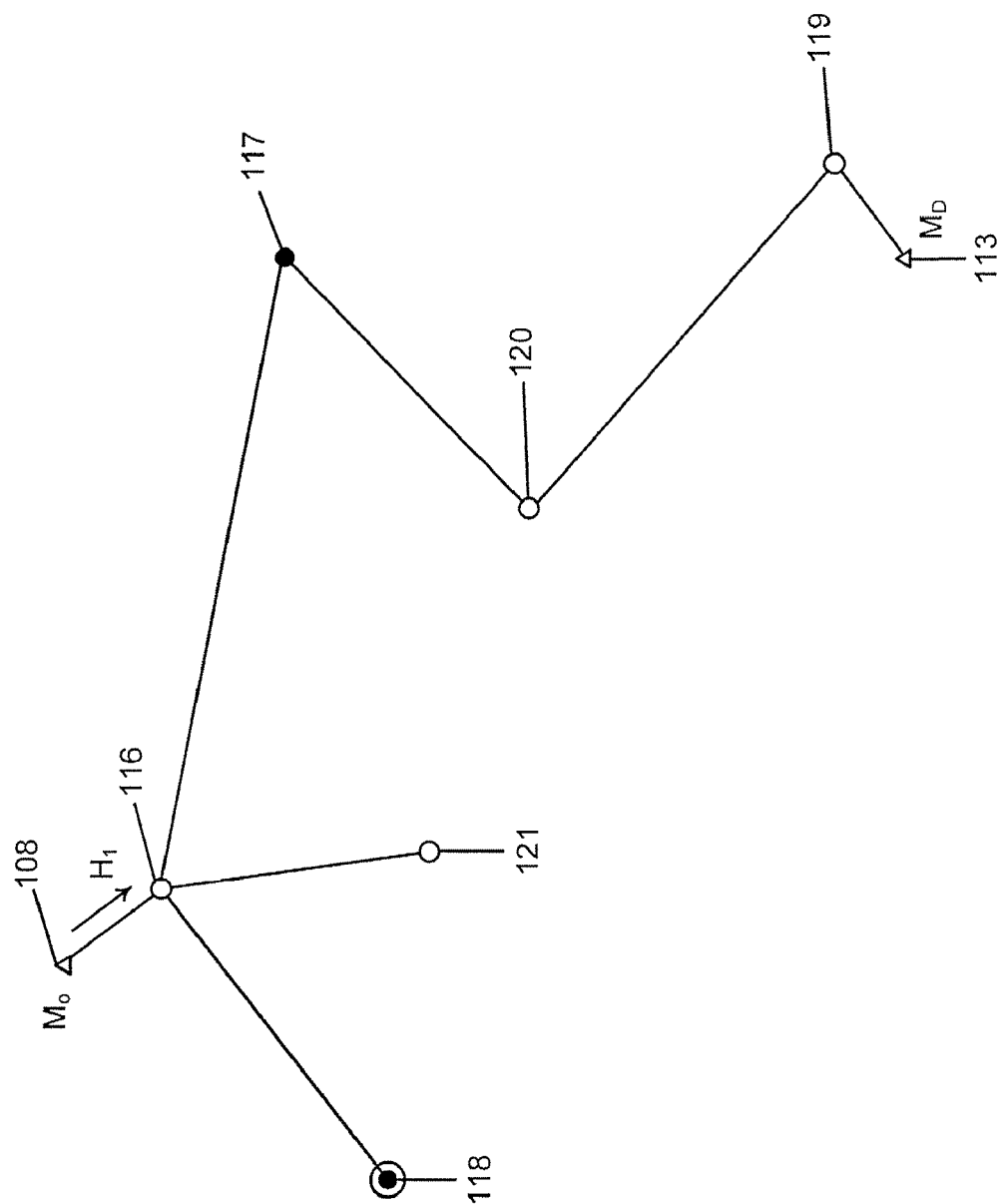
FIG. 6 is a TS flow diagram illustrating admission control of a TS at a first node along a potential TS route according to an embodiment.

FIG. 6 is a TS flow diagram illustrating admission control of a TS at a first node 116 along a potential TS route according to an embodiment. In an embodiment, the originating station Mo, node 108, may utilize route algorithms to determine possible routes to the destination station $M_D$, node 113. Node 108 may assess or determine the traffic load (904) according to one of the methods explained above. Node 108 may select an appropriate route, which may be application specific. For example, the route may be selected based on the distance to the next hop, the traffic load at the next hop node, the degree of the next hop node, and/or another criteria, and/or combinations thereof.

In an embodiment, the average number of media access control (MAC) service data unit (MSDU) packets to be transferred during a schedule service interval (SSI) of $H_1$ may be calculated. The average number of packets (N) may be the product of the guaranteed data rate (G) and SSI, divided by the nominal packet size (L). The average number of packets may be calculated at lest in part by utilizing the equation:

$$\left\lceil \frac{SSI \times G}{L} \right\rceil$$

The downstream TXOP, the portion of time scheduled per SSI for transmission of data needed for $H_1$, may also be calculated. In this case, we denote the period of time $t_{TXOP}$ with the shorthand notation TXOP. The calculation may depend at least in part upon the existing traffic along $H_1$. If the existing traffic includes a TS of the same class as Mo, and does not require a shorter SSI, then data packets from Mo may be aggregated with the existing TS without the need for additional overhead. In an embodiment, the TXOP for $H_1$ may be the maximum of the largest allowable MSDU (2304 bytes) divided by the physical transmission rate (R), and the product of the average number of data packets (N) and the nominal packet size divided by the physical transmission rate. The TXOP may be calculated based at least in part by the equation:

$$\max\left(\frac{N \times L}{R}, \frac{L_{max}}{R}\right)$$

If there is no existing TS between node 108 and node 116 of the same class, or if the new data stream requires a smaller SSI, the TXOP may include additional overhead for handling an additional class or the smaller SSI. A smaller SSI implies increased overhead per data bit. It is therefore desirable to select paths with smaller number of hops. This can increase efficiency as well as improve the aggregate network transport capacity. In this case, the TXOP may be determined at least in part by the equation:

$$\max\left(\frac{N \times L}{R} + O, \frac{L_{max}}{R} + O\right)$$

The total projected downstream traffic load at node 108 may be calculated at least in part by summing the TXOP for $H_1$, and dividing by the SSI for $H_1$, and summing the TXOP of all the other TSs scheduled to be transmitted, divided by their respective SSI. The traffic load due to $H_1$ may be summed with other existing traffic loads due to TS departing node 108. The downstream traffic load may be represented at least in part by the equation:

$$\frac{TXOP_{H1}}{SSI_{H1}} + \sum_K \frac{TXOP_K}{SSI_K}$$

The upstream traffic load at node 108 may remain unchanged. Upstream calculations for non originating nodes are discussed hereinafter.

Node 108 may compare the sum of the upstream traffic loads and the downstream traffic loads with a predetermined load threshold to determine whether Mo can be accommodated. If it is determined Mo can be accommodated, node 108 may reserve the TXOP, update the load information in the beacon signal, and send an admission request to node 116. Otherwise access may be denied.

In an embodiment, the TXOP calculations and the thresholds may be partitioned by QoS. For example, a node may allocate 30% of its traffic to a VOIP type QoS, 10% to real time interactive gaming type of QoS, and 60% to web browsing type QoS. The traffic load determinations and the threshold comparisons may then be QoS specific. Dynamic QoS allocation may also be accomplished if there is not enough bandwidth to support a data stream. The node may reallocate a portion of the bandwidth partitioned for another QoS for a new data stream.

Node 108 may maintain the TXOP reservation until it receives a denial of admission from a downstream node. On receiving a denial of admission, the origination station may cancel the TXOP reservation, and may invoke routing algorithms to determine alternate routes to the destination station 113. If an appropriate route is found, node 108 may restart the admission process described above.

Figure 7:
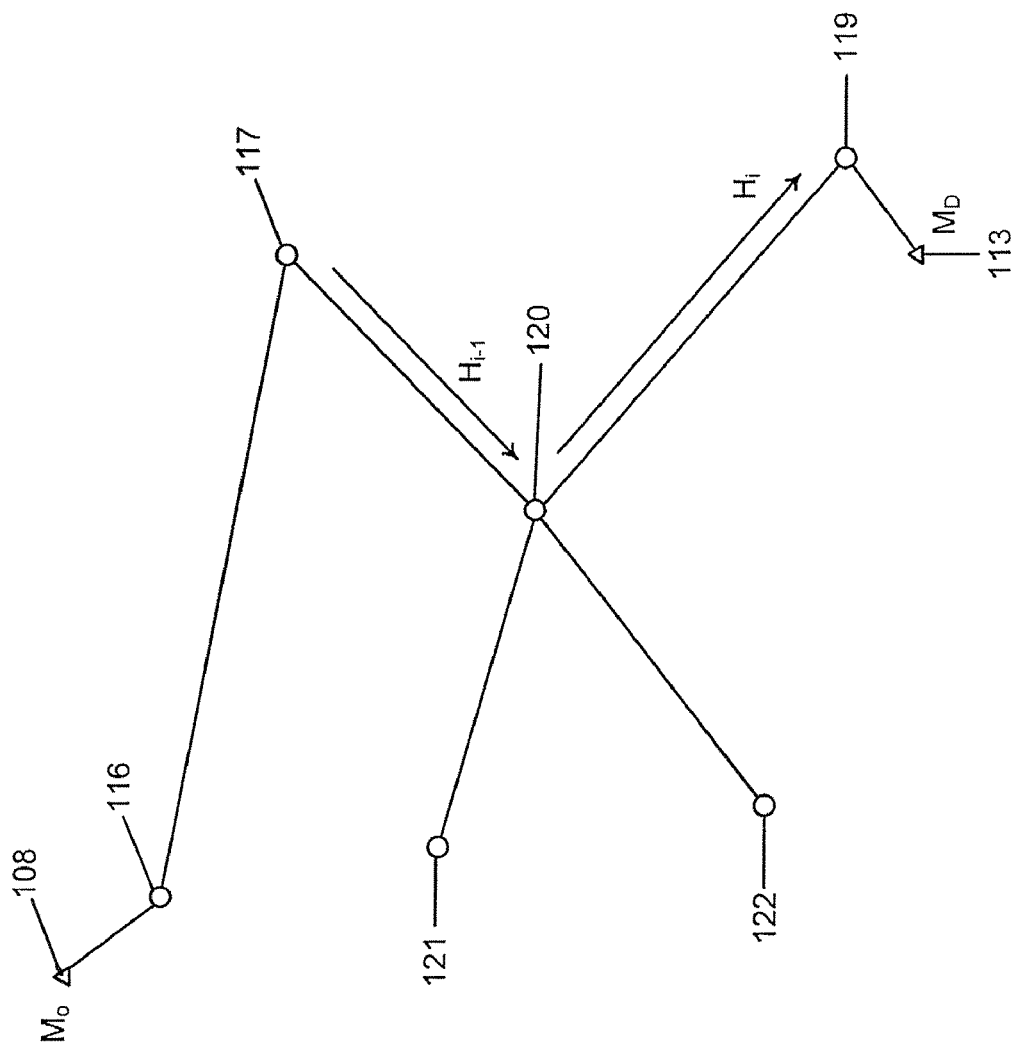
FIG. 7 is a TS flow diagram illustrating admission control of a TS at an exemplary node along a potential TS route according to an embodiment.

FIG. 7 shows an exemplary hop $H_i$ of TS, Mo, along a potential TS route according to an embodiment. If node 120 receives an admission request from node 117, node 120 may calculates the upstream (fourth hop) and downstream (third hop) TXOP, and projected traffic load. For simplicity and generality in describing admission control at node 120, the upstream hop may be described as $H_i$ and the downstream hop as $H_{i-1}$. Admission control for node 120 may be applied to any node or hop of any TS in the mesh network 100.

In an embodiment, the average number of MSDU packets to be transferred during a SSI of $H_i$ may be calculated. The average number of packets (N) may be the product of a guaranteed data rate (G) and SSI divided by the nominal packet size (L). The average number of packets may be described at least in part by the equation:

$$\left\lceil \frac{SSI \times G}{L} \right\rceil$$

The downstream TXOP for $H_i$ may also be calculated. The calculation may depend at least in part upon the existing traffic along $H_i$. If the existing traffic includes a TS of the same class as Mo, and does not require a smaller SSI, then data packets from M may be aggregated with the existing TS without the need for additional overhead. The TXOP for $H_i$ may be the maximum of the relatively largest allowable MSDU (2304 bytes) ($L_{max}$), divided by the physical transmission rate (R), and the product of the average number of data packets (N) and the nominal packet size, divided by the physical transmission rate. The TXOP may be described at least in part upon the equation:

$$\max\left(\frac{N \times L}{R}, \frac{L_{max}}{R}\right)$$

The TXOP may include additional overhead for handling an additional class or smaller SSI. In this situation, the TXOP may be described at least in part upon the equation:

$$\max\left(\frac{N \times L}{R} + O, \frac{L_{max}}{R} + O\right)$$

The total projected downstream traffic load at node 120 may be calculated at least in part by summing the TXOP for $H_i$ and dividing by the SSI for $H_i$ and summing with the TXOP of all the other traffic streams scheduled to depart node 120 divided by their respective SSI. Specifically, the traffic load due to $H_i$ is summed with other existing traffic loads due to TS departing node 120 for each of the neighboring nodes k, node 117, node 119, node 121, and node 122. The downstream traffic load may be described at least in part upon the equation:

$$\frac{TXOP_{H_i}}{SI_{H_i}} + \sum_K \frac{TXOP_K}{SSI_K} \text{(departing)}$$

Node 120 may also calculate the upstream TXOP for $H_{i-1}$. The calculation may depend at least in part upon the existing traffic along the link $H_{i-1}$. If the existing traffic includes a TS of the same class as Mo, and does not require a smaller SSI, then data packets from Mo may be aggregated with the existing TS without the need for additional overhead. The TXOP for $H_{i-1}$ may be the maximum of the largest allowable MSDU (2304 bytes) divided by the physical transmission rate (R), and the product of the average number of data packets (N) and the nominal packet size divided by the physical transmission rate. The TXOP may be described at least in part upon the equation:

$$\max\left(\frac{N \times L}{R}, \frac{L_{max}}{R}\right)$$

If the TXOP includes additional overhead for handling an additional class or the smaller SSI, the TXOP may be described at least in part upon the equation:

$$\max\left(\frac{N \times L}{R} + O, \frac{L_{max}}{R} + O\right)$$

The total projected upstream traffic load at node 120 may be calculated by summing the TXOP for $H_{i-1}$ and dividing by the SSI for $H_{i-1}$ and summing the upstream TXOP of all the other traffic streams scheduled to arrive at node 120 divided by their respective SSI. The traffic load due to $H_i$ may summed with other existing traffic loads due to TS arriving at node 120 from each of its neighbors k, node 117, node 119, node 121, and node 122. The upstream traffic load may be described at least in part upon the equation:

$$\frac{TXOP_{H_{i-1}}}{SSI_{H_{i-1}}} + \sum_K \frac{TXOP_K}{SSI_K} \text{(arriving)}$$

Node 120, after making the above calculations, may compare the sum of the upstream traffic loads and the downstream traffic loads, with a predetermined load threshold to, at least in part, determine whether Mo can be accommodated. If it is determined that Mo can be accommodated, node 120 may reserve the TXOP, update the load information in its beacon, and send an admission request to node 119. If it is determined that Mo cannot be accommodated, access may be denied and node 120 may send a message to node 117 denying admission of the TS Mo.

In an embodiment, the TXOP calculations and access thresholds may be partitioned by QoS. The traffic load determinations and the threshold comparisons may be QoS specific.

Figure 8:
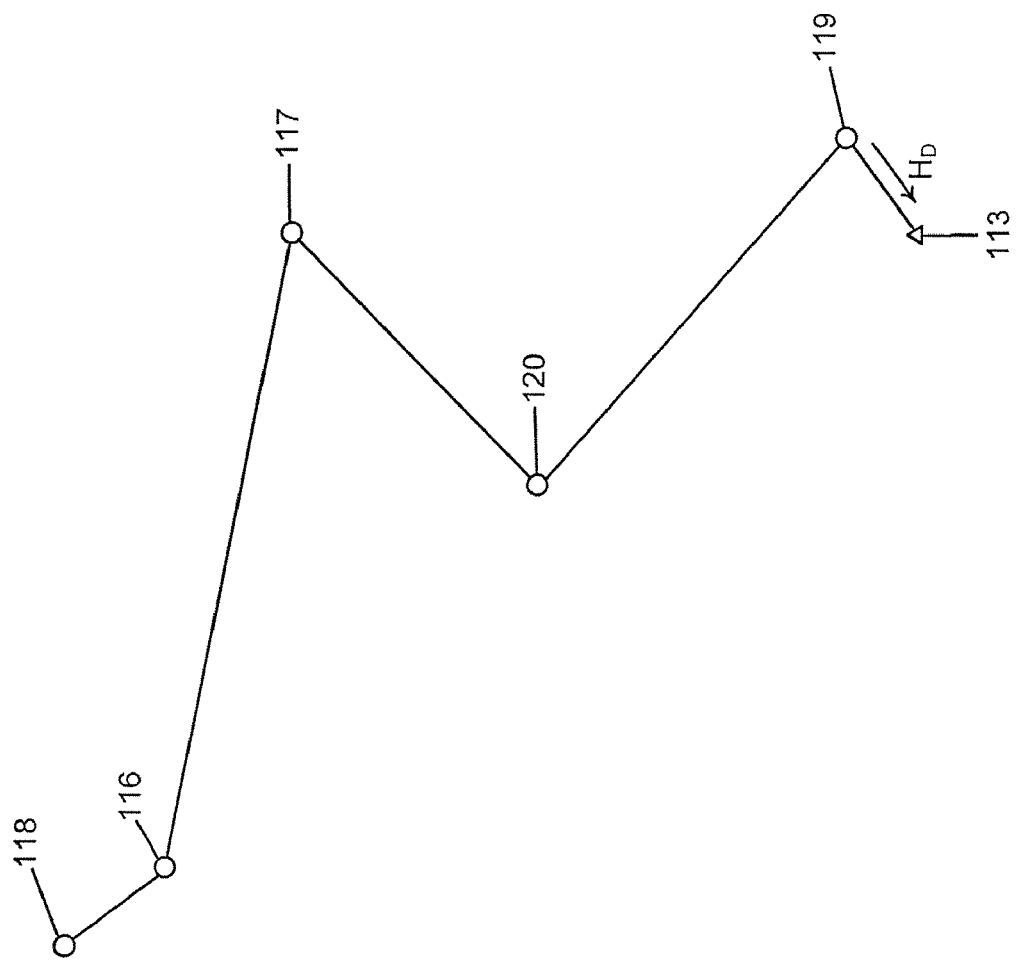
FIG. 8 is a flow diagram illustrating admission control of a TS at a destination node along a potential TS route according to an embodiment.

FIG. 8 shows the final hop HD to a destination station, node 113. Admission control at node 113 for the HD may be the same as hop $H_i$ except that the downstream TXOP calculation may be omitted. The promulgation of an admission request to the next hop station may also be omitted.

Each of the nodes along M's route may maintain a respective TXOP reservation until it receives a denial of admission from a downstream node. On receiving a denial of admission, the origination station may cancel the TXOP reservation and may invoke routing algorithms to determine alternate routes to the destination station, node 113. The admission process for each node along the route may again be invoked.

The mesh network 100 or any of the nodes may partition access by QoS requirements. One method of QoS admission control may be to divide the TS classes into multiple classes, e.g., a high priority class and a low priority class. The high priority class TS may be serviced within one SSI at each node along the route. A worst case delay may be calculated by multiplying the number of hops by the SSI. For example, in a voice application a delay time of no greater than about 50 milliseconds may be allowed. Thus, a high priority stream may be routed through up to five nodes with about a 10 millisecond SSI.

Figure 9:
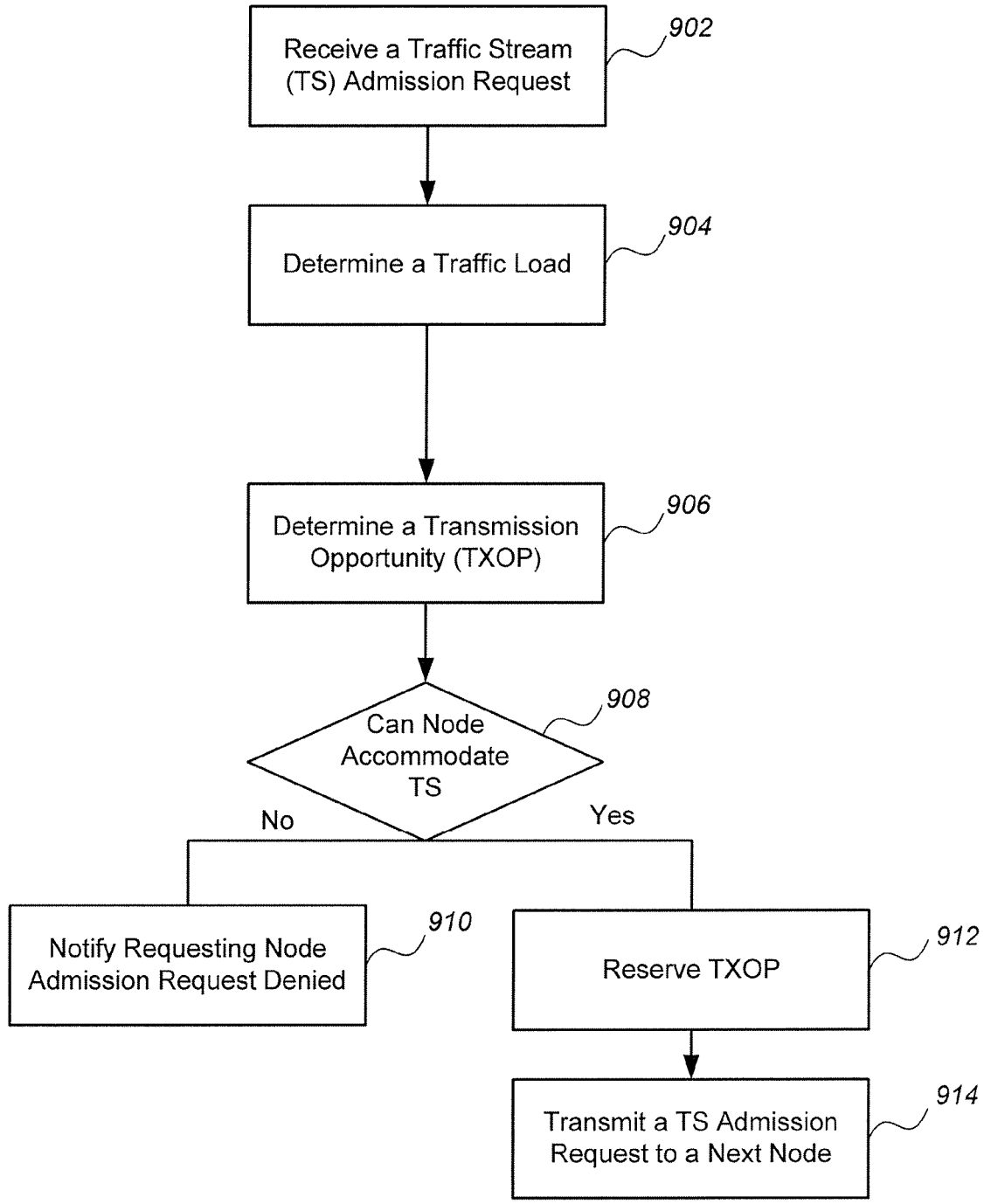
FIG. 9 is a flow diagram illustrating a method of admission control of a TS at an exemplary node along a potential TS route according to an embodiment.

FIG. 9 is a flow diagram illustrating a method of admission control of a TS at an exemplary node along a potential TS route according to an embodiment. The node may receive a TS admission request (902). The TS admission request may be transmitted from another node or the admission request may be for a TS originating from the node itself. The node may determine the traffic load in the neighborhood of the node (904). The node may determine the traffic load at least in part by measuring the load at the node or by determining the load from information transmitted by the neighbors of the node. Traffic load calculations and measurements may be accomplished by various methods including, but not limited to, the methods and/or equivalents described herein. The traffic load may be determined through measurements at the node itself combined with measurements transmitted from the neighbors of the nodes. An exemplary hybrid traffic load calculation is also described above, which also may be utilized to determine traffic loads.

The node may determine the TXOP (906). If the node is the originating node, the downstream TXOP may be calculated. If the node is the destination node, the upstream TXOP may be calculated. If the node is an intermediate node, the upstream and downstream TXOPs may be calculated. The node may compare the TXOP with the TXOP available (908). If it is determined there is not adequate TXOP available, the node may then notify the requesting node that the admission of the TS has been denied (910). If it is determined that there is TXOP available, the node may reserve the TXOP (912), and may send a TS admission request to the next node (914).

Figure 10:
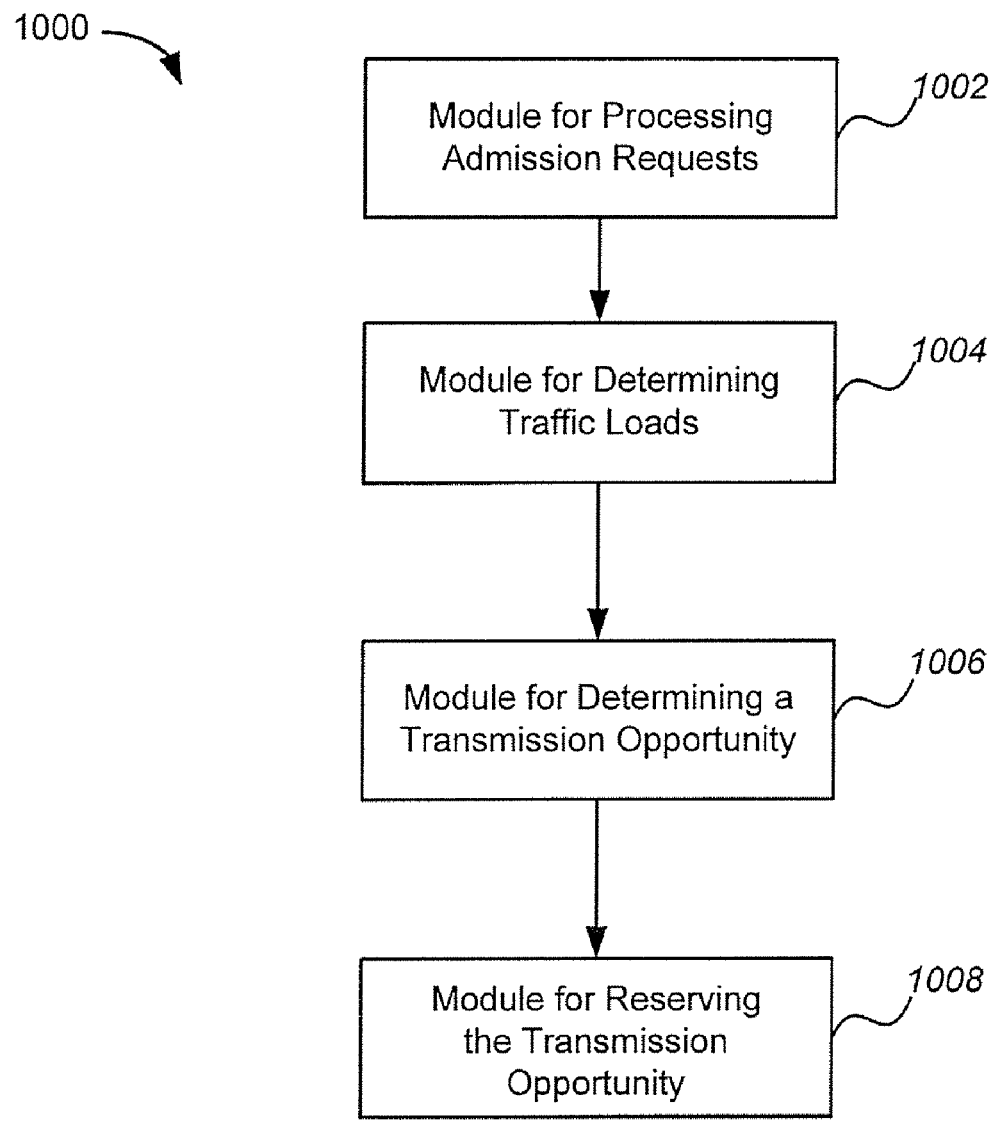
FIG. 10 is a block diagram illustrating exemplary components for the apparatus and the means for apparatus for admission control according to an embodiment.

FIG. 10 is a block diagram illustrating exemplary components for the apparatus and the means for apparatus for admission control according to an embodiment. The apparatus 1000 may include a module 1002 for processing admission requests configured to process a TS admission request, a module 1004 for determining traffic loads configured to determine the traffic load of a node, a module 1006 for determining a TXOP configured to determine an upstream TXOP and/or a downstream TXOP, and a module 1008 for reserving a TXOP configured to reserve the upstream TXOP and/or the downstream TXOP.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions, stored on a computer readable medium that is part of a computer program product, which may be read and/or executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure may be embodied in other specific forms without departing from its spirit or essential characteristics. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A method of controlling the admission of a traffic stream in a mesh network, comprising:
   transmitting a sum vector from nodes to neighboring nodes in the mesh network, the sum vector containing transmit and receive times for an established period of time during which traffic was transmitted and received between the nodes;
   receiving at a second node a traffic stream admission request to admit the traffic stream from a first node;
   determining a traffic load for the second node based on the sum vector associated with one of the second node and a downstream node, wherein the traffic load for the second node is determined by comparing transmit and receive row and column pairs in a load matrix and selecting a relative maximum value; and
   determining whether to admit or deny the traffic stream from the first node using the determined traffic load.

2. The method of claim 1, wherein:
   the established period of time is a scheduled service interval; and
   the determining the traffic load includes determining a fraction of the scheduled service interval that represents a transmission opportunity for the traffic stream.

3. The method of claim 2, wherein the transmission opportunity is established based on a factor selected from a group consisting of a guarantee rate, a minimum physical transmission rate, a frame size, a scheduled service interval, an inter delay period, and a beacon interval.

4. The method of claim 2, further comprising receiving at the second node a plurality of traffic stream admission requests to admit a plurality of traffic streams having a plurality of quality of service (QoS) parameters and partitioning the transmit opportunity for each of the plurality of traffic streams based on respective ones of the plurality of QoS parameters.

5. The method of claim 2, wherein the transmission opportunity is established based on one of: an average packet time and a maximum allowable packet time; and the average packet time plus an overhead time and the maximum allowable packet time plus the overhead time.

6. The method of claim 1, further comprising selecting an alternate node for the second node if the traffic stream admission request is denied.

7. The method of claim 1, further comprising:
establishing the established period of time as a scheduled service interval; and
receiving transmit and receive fractions of times from a neighboring node.

8. The method of claim 1, wherein the receiving the sum vector includes receiving the sum vector as a sum of transmit and receive fractions of times from a neighboring node.

9. The method of claim 1, further comprising measuring a channel busy fraction of time for a channel connecting the first node to the second node.

10. The method of claim 1, wherein:
the traffic stream admission request includes a traffic stream class; and
the determining whether to admit or deny the traffic stream from the first node includes determining whether to admit or deny the traffic stream using the traffic stream class.

11. The method of claim 1, further comprising monitoring an average quiet network access vector time.

12. A computer program product, comprising:
a non-transitory computer readable medium including instructions, which, when read by a computer, cause the computer to perform the steps of:
transmitting a sum vector from nodes to neighboring nodes in a mesh network, the sum vector containing transmit and receive times for an established period of time during which traffic was transmitted and received between the nodes;
receiving at a second node a traffic stream admission request to admit a traffic stream from a first node;
determining a traffic load for the second node based on the sum vector associated with one of the second node and a downstream node, wherein the traffic load for the second node is determined by comparing the transmit and receive row column pairs in a load matrix and selecting a relative maximum value; and
determining whether to admit or deny the traffic stream from the first node using the traffic load.

13. An apparatus for controlling the admission of a traffic stream in a mesh network, comprising:
a receiving module configured to receive a sum vector from neighboring nodes in the mesh network, the sum vector containing transmit and receive times for an established period of time during which traffic was transmitted and received between the nodes and to receive a traffic stream admission request to admit the traffic stream from a first node; and
a processor, coupled to the receiving module, configured to determine a traffic load for a second node receiving the traffic stream admission request, the traffic load determined based on the sum vector and comparing transmit and receive row column pairs in a load matrix and selecting a relative maximum value, the determining module further configured to determine whether to admit or deny the traffic stream related to the request from the first node using the determined traffic load.

14. The apparatus of claim 13, further comprising:
a service interval module configured to set the established period of time as a scheduled service interval; and
a time module that, in connection with the determining module being configured to determine the traffic load, is configured to determine a fraction of the scheduled service interval that represents a transmission opportunity for the traffic stream.

15. The apparatus of claim 14, wherein the transmission opportunity is established based on a factor selected from a group consisting of a guarantee rate, a minimum physical transmission rate, a frame size, a scheduled service interval, an inter delay period, and a beacon interval.

16. The apparatus of claim 14, wherein the receiving module is further configured to receive a plurality of traffic stream admission requests to admit a plurality of traffic streams having a plurality of quality of service (QoS) parameters and the time module is further configured to partition the transmit opportunity for each of the plurality of traffic streams based on respective ones of the plurality of QoS parameters.

17. The apparatus of claim 14, wherein the transmission opportunity is established based on one of: an average packet time and a maximum allowable packet time; and the average packet time plus an overhead time and the maximum allowable packet time plus the overhead time.

18. The apparatus of claim 13, further comprising a selecting module configured to select an alternate node for the second node if the traffic stream admission request is denied.

19. The apparatus of claim 13, further comprising:
a service interval module configured to establish the established period of time as a scheduled service interval; and
a time module configured to receive transmit and receive fractions of times from a neighboring node.

20. The apparatus of claim 13, wherein the time module is further configured to receive the sum vector as a sum of transmit and receive fractions of times from a neighboring node.

21. The apparatus of claim 13, further comprising a measuring module configured to measure a channel busy fraction of time for a channel connecting the first node to the second node.

22. The apparatus of claim 13, wherein:
the traffic stream admission request includes a traffic stream class; and
the determining whether to admit or deny the traffic stream from the first node includes determining whether to admit or deny the traffic stream using the traffic stream class.

23. The apparatus of claim 13, further comprising a monitoring module configured to monitor an average quiet network access vector time.

24. An apparatus for controlling the admission of a traffic stream in a mesh network, comprising:
means for receiving at a second node receive a sum vector from neighboring nodes in the mesh network, the sum vector containing transmit and receive times for an established period of time during which traffic was transmitted and received between the nodes and for receiving a traffic stream admission request to admit the traffic stream from a first node; and
means for determining the traffic load for the second node based on the sum vector and for determining whether to admit or deny the traffic stream from the first node using the determined traffic load, wherein the traffic load for the second node is determined by comparing transmit and receive row column pairs in a load matrix and selecting a relative maximum value.

25. The apparatus of claim 24, further comprising means for accepting or denying the traffic stream admission request, the traffic stream admission request accepted if the sum vector plus a transmit time for the traffic stream is less than the established period.

26. The apparatus of claim 24, wherein:
the established period of time includes a scheduled service interval; and
the means for determining further determines a fraction of the scheduled service interval that represents a transmission opportunity for the traffic stream.

27. The apparatus of claim 26, wherein the transmission opportunity is established based on a factor selected from a group consisting of a guarantee rate, a minimum physical transmission rate, a frame size, a scheduled service interval, an inter delay period, and a beacon interval.

28. The apparatus of claim 26, wherein the means for receiving is further for receiving at the second node a plurality of traffic stream admission requests to admit a plurality of traffic streams having a plurality of quality of service (QoS) parameters and the means for determining is further for partitioning the TXOP for each of the plurality of traffic streams based on respective ones of the plurality of QoS parameters.

29. The apparatus of claim 26, wherein the transmission opportunity is established based on one of: an average packet time and a maximum allowable packet time; and the average packet time plus an overhead time and the maximum allowable packet time plus the overhead time.

30. The apparatus of claim 24, further comprising means for selecting an alternate node for the second node and forwarding the traffic stream request to the alternate node if the traffic stream admission request is denied.

31. The apparatus of claim 24, further comprising:
means for establishing the established period of time as a scheduled service interval; and
means for receiving transmit and receive fractions of times from a neighboring node.

32. The apparatus of claim 24, wherein the means for receiving is further for receiving the sum vector as a sum of transmit and receive fractions of times from a neighboring node.

33. The apparatus of claim 24, further comprising means for measuring a channel busy fraction of time for a channel connecting the first node to the second node.

34. The apparatus of claim 24, wherein:
the traffic stream admission request includes a traffic stream class; and
the means for determining is further for determining whether to admit or deny the traffic stream using the traffic stream class.

35. The apparatus of claim 24, further comprising means for monitoring an average quiet network access vector time.

36. A method of controlling a traffic stream in a mesh network, comprising:
receiving, at a second node in the mesh network, a traffic stream admission request to admit a traffic stream from a first node in the mesh network;
determining a traffic load for the second node, wherein the traffic load is determined in part by monitoring a neighboring node beacon and by comparing transmit and receive row column pairs in a load matrix and selecting a relative maximum value, wherein the beacon comprises traffic load information for the neighboring node; and
determining whether to admit or deny the traffic stream from the first node using the traffic load information,
wherein the traffic load information includes the amount of time that media around the neighboring node was loaded over an established period of time.

37. A non-transitory computer readable medium, having instructions stored thereon, for implementing a method of controlling a traffic stream in a mesh network, comprising:
instructions for receiving, at a second node in the mesh network, a traffic stream admission request to admit a traffic stream from a first node in the mesh network;
instructions for determining a traffic load for the second node, wherein the traffic load is determined in part by monitoring a neighboring node beacon and by comparing transmit and receive row column pairs in a load matrix and selecting a relative maximum value, wherein the beacon comprises traffic load information for the neighboring node; and
instructions for determining whether to admit or deny the traffic stream from the first node using the traffic load information,
wherein the traffic load information includes the amount of time that media around the neighboring node was loaded over an established period of time.

38. An apparatus for controlling a traffic stream in a mesh network, comprising:
means for receiving, at a second node in the mesh network, a traffic stream admission request to admit a traffic stream from a first node in the mesh network; and
means for determining a traffic load for the second node and whether to admit or deny the traffic stream from the first node using the traffic load information, wherein the traffic load is determined in part by monitoring a neighboring node beacon and by comparing transmit and receive row column pairs in a load matrix and selecting a relative maximum value, wherein the beacon comprises traffic load information for the neighboring node,
wherein the traffic load information includes the amount of time that media around the neighboring node was loaded over an established period of time.

39. An apparatus for controlling a traffic stream in a mesh network, comprising:
a receiving module configured to receive a traffic stream admission request to admit a traffic stream from a first node in the mesh network; and
a processor, coupled to the receiving module, configured to determine a traffic load for a second node in the mesh network receiving the traffic stream admission request, wherein the traffic load is determined in part by monitoring a neighboring node beacon and by comparing transmit and receive row column pairs in a load matrix and selecting a relative maximum value, wherein the beacon comprises traffic load information for the neighboring node, and determine whether to admit or deny a traffic stream related to the request from the first node using the traffic load information,
wherein the traffic load information includes the amount of time that media around the neighboring node was loaded over an established period of time.

* * * * *